United States Patent
Miyajima et al.

(10) Patent No.: US 7,791,024 B2
(45) Date of Patent: Sep. 7, 2010

(54) METHOD OF MEASURING DIMENSION OF FILM CONSTITUTING ELEMENT AND APPARATUS THEREFOR

(75) Inventors: Toyoo Miyajima, Kawasaki (JP);
Yasutoshi Kotaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 12/196,440

(22) Filed: Aug. 22, 2008

(65) Prior Publication Data

US 2009/0050804 A1    Feb. 26, 2009

(30) Foreign Application Priority Data

Aug. 24, 2007    (JP) ............................. 2007-218142

(51) Int. Cl.
*H01J 37/26* (2006.01)
(52) U.S. Cl. .................. 250/311; 250/306; 250/307; 250/310; 430/296
(58) Field of Classification Search .............. 250/306, 250/307, 308, 309, 310, 311; 430/296
See application file for complete search history.

(56) References Cited

U.S. PATENT DOCUMENTS

| 4,697,080 | A | * | 9/1987 | King | 250/307 |
| 2006/0108545 | A1 | * | 5/2006 | Yoshiki et al. | 250/492.21 |
| 2006/0127703 | A1 | * | 6/2006 | Takekuma et al. | 428/831 |
| 2006/0138326 | A1 | * | 6/2006 | Jiang et al. | 250/311 |

OTHER PUBLICATIONS

Egerton, R.F.; "Electron Energy-Loss Spectroscopy in the Electron Microscope Second Edition"; Plenum Press, New York and London; pp. 301-307, 1996.
Crewe, A.V. et al.; "Visibility of Single Atoms"; Science, vol. 168, pp. 1338-1340; 1970.

\* cited by examiner

*Primary Examiner*—Jack I Berman
*Assistant Examiner*—Nicole Ippolito Rausch
(74) *Attorney, Agent, or Firm*—Westerman, Hattori, Daniels & Adrian, LLP

(57) ABSTRACT

A method of evaluating an element that includes the step of preparing a thin evaluation sample including a first portion in which a first layer containing a first material and a second layer containing a second material are laminated, a second portion containing the first material, and a third portion containing the second material; and calculating the thickness of the first layer in the first portion.

10 Claims, 11 Drawing Sheets

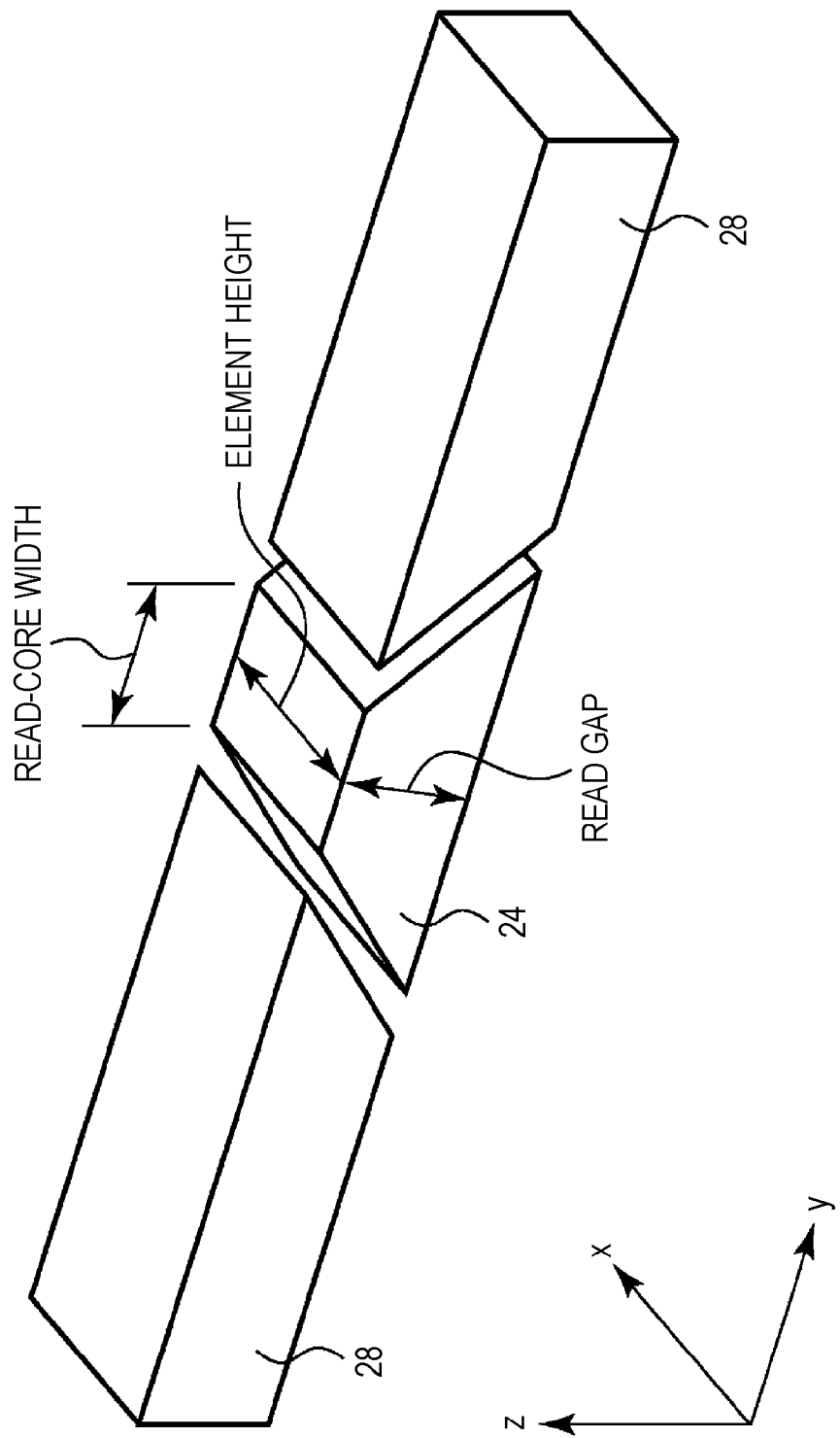

METHOD OF MEASURING DIMENSION OF FILM CONSTITUTING ELEMENT AND APPARATUS THEREFOR

CROSS-REFERENCES TO RELATED APPLICATIONS

This application is based upon and claims the benefit of priority from the prior Japanese Patent Application No. 2007-218142, filed on Aug. 24, 2007 the entire contents of which are incorporated herein by reference.

TECHNICAL FIELD

The present invention relates to a method of measuring a dimension of a film constituting an element and an apparatus that can measure a dimension of a film constituting an element.

BACKGROUND

With the reduction in bit size due to an increase in the recording density of a recording device, the size of a read element installed in a magnetic head has also been decreased. The read element is an element for reading out magnetic information recorded on a recording medium. In the production of the read element, it is important to control a read-core width and a read gap, which are specified by the bit size. It is also important to control an element height (MR height), which affects the element resistance, the output, the sensitivity, or the like. In order to improve the controllability of the read-core width, the read gap, and the element height, it is necessary to measure these dimensions of a produced read element and to feedback the measured values to the conditions for the production.

In recent recording devices whose recording density has been increased, the element size of the read element has been reduced. Consequently, a transmission electron microscope (TEM) having a high spatial resolution is essential for the evaluation of the shape of such an element.

In the evaluation using a TEM, an evaluation sample is processed into a thin section having a thickness of about several tens to several hundreds of nanometers. In the case where a cross-sectional sample obtained in the air bearing surface (ABS) direction is used as the evaluation sample, observation cannot be performed in the element height direction, which is orthogonal to the ABS direction. Note that the read-core width and the read gap are measured from the cross section of the sample obtained in the ABS direction.

Consequently, in a known method of evaluating an element using a TEM, two samples, namely, a cross-sectional sample obtained in the ABS direction and a cross-sectional sample obtained in the element height direction are prepared. The read-core width and the read gap are measured using the cross-sectional sample obtained in the ABS direction, and the element height is measured using the cross-sectional sample obtained in the element height direction.

However, as described above, in the known method of evaluating an element, the read-core width, the read gap, and the element height cannot be measured using a single TEM sample. Therefore, in order to measure the read-core width, the read gap, and the element height, it is necessary to prepare at least two evaluation samples. Accordingly, much labor and time have been required for the preparation of the evaluation samples.

Furthermore, because of a reduction in the element size due to an increase in the recording density, the preparation of a TEM sample for observation having the cross section obtained in the element height direction has also become difficult. More specifically, a magnetic head having an areal density of about 100 Gbpsi has an optical read-core width of about 100 nm, and it is believed that, in the near future, the optical read-core width will be reduced to 60 nm or less for an areal density of 300 Gbpsi or more. In this case, the read-core width is equal to or smaller than the thickness of a TEM sample. Accordingly, it is necessary to perform a process for producing a cross-sectional thin section with pinpoint accuracy. Therefore, it is difficult to prepare a TEM sample having a cross section at the central position of the core width (a cross section obtained in the element height direction). Accordingly, much labor and time are necessary, and the yield is also decreased.

As described above, the known technique is disadvantageous in that the read-core width, the read gap, and the element height of a read element of a magnetic head cannot be evaluated using a single sample.

SUMMARY

According to one aspect of the present invention, a method of evaluating an element includes the step of preparing a thin evaluation sample including a first portion in which a first layer containing a first material and a second layer containing a second material are laminated, a second portion containing the first material, and a third portion containing the second material; and calculating the thickness of the first layer in the first portion.

BRIEF DESCRIPTION OF THE DRAWINGS

FIG. 2 is a perspective view showing the structure of the read element of the magnetic head;

FIGS. 5A and 5B are schematic views showing a transmission electron microscopy (TEM) sample used in the method of evaluating an element according to the embodiment;

DETAILED DESCRIPTION OF THE EMBODIMENTS

A method of evaluating an element and an apparatus for evaluating an element according to an embodiment will now be described with reference to FIG. 1 to FIG. 11.

Figure 1A:
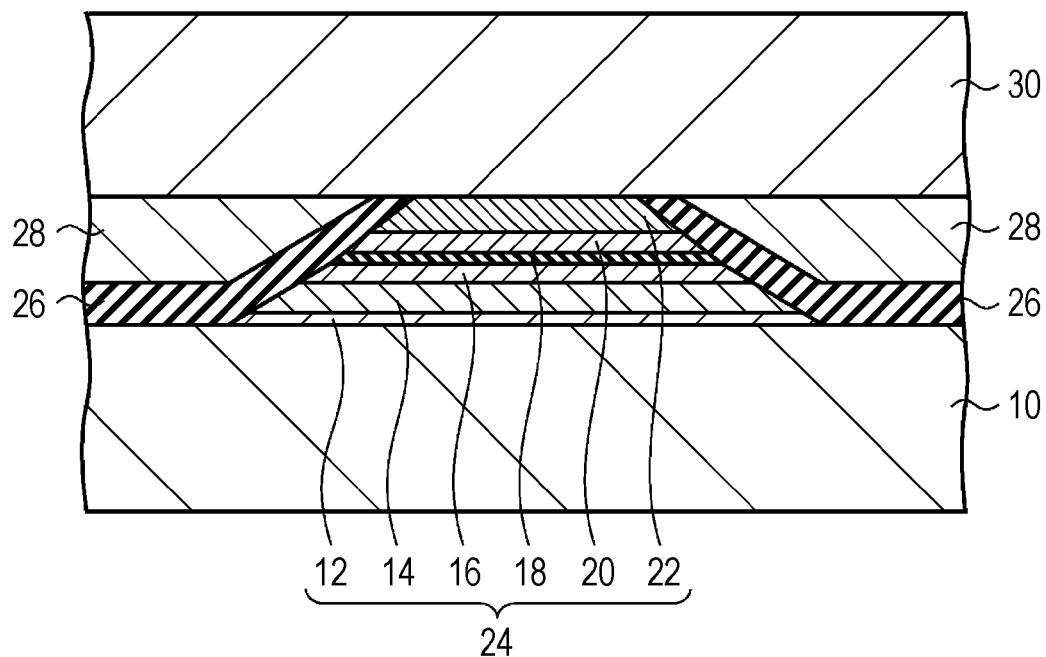
FIGS. 1A and 1B are schematic cross-sectional views showing the structure of a read element of a magnetic head.

First, the structure of a read element of a magnetic head, which is an evaluation target of an evaluation method and an apparatus therefor according to this embodiment, will now be described with reference to FIGS. 1A and 1B, and FIG. 2. FIG. 1A is a schematic cross-sectional view of an air bearing surface (ABS), and FIG. 1B is a schematic cross-sectional view along a direction orthogonal to the ABS (i.e., the element height direction).

Figure 1B:
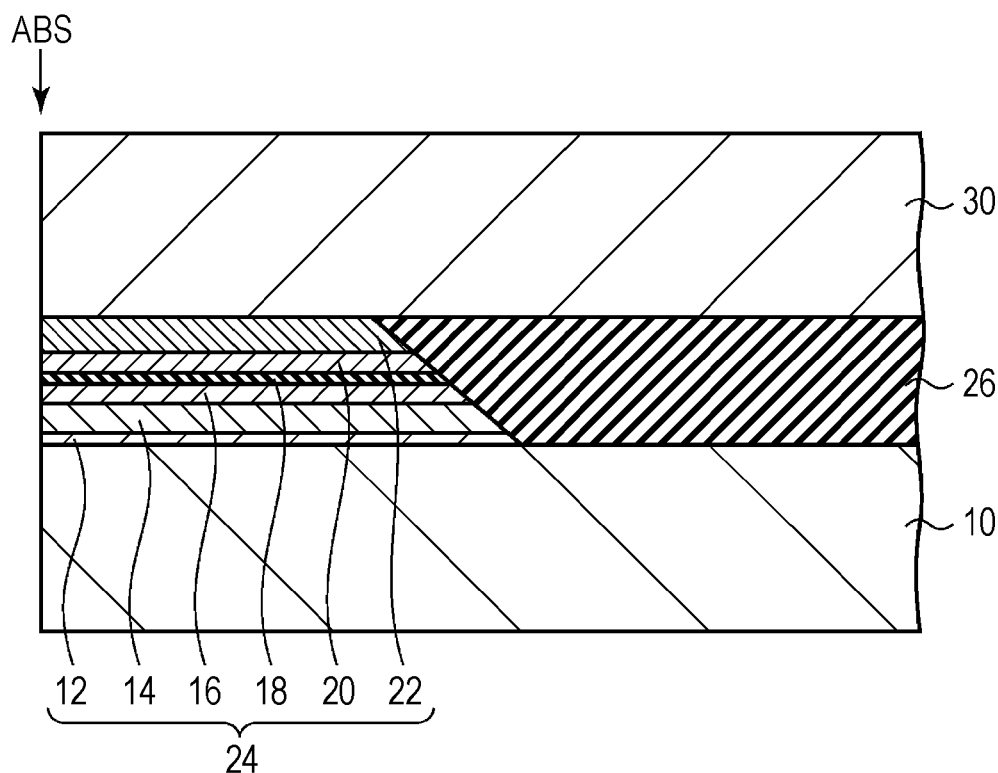

As shown in FIGS. 1A and 1B, a base layer 12 made of, for example, tantalum (Ta) is provided on a lower shield layer 10 made of a soft magnetic material. An example of the soft magnetic material is nickel-iron (NiFe). In addition, an antiferromagnetic layer 14 made of a manganese-containing antiferromagnetic material is provided on the base layer 12. An example of the manganese-containing antiferromagnetic material used for the antiferromagnetic layer 14 is palladium-platinum-manganese (PdPtMn). A pinned magnetic layer 16 made of a ferromagnetic material is provided on the antiferromagnetic layer 14. The pinned magnetic layer 16 has a laminated ferri structure including, for example, a ferromagnetic layer made of a ferromagnetic material such as cobalt-iron (CoFe), a nonmagnetic layer made of a nonmagnetic material such as ruthenium (Ru), and a ferromagnetic layer made of a ferromagnetic material such as CoFe. A barrier layer 18 made of an insulating material such as alumina is provided on the pinned magnetic layer 16. A free magnetization layer 20 composed of a laminated film made of soft magnetic materials, e.g., a CoFe film and a NiFe film, is provided on the barrier layer 18. A cap layer 22 made of a nonmagnetic material such as Ta is provided on the free magnetization layer 20.

The read element of the magnetic head includes a laminate composed of the base layer 12, the antiferromagnetic layer 14, the pinned magnetic layer 16, the barrier layer 18, the free magnetization layer 20, and the cap layer 22. The laminate is processed so as to have a mesa shape, as shown in FIGS. 1A and 1B. In this manner, a tunnel magnetoresistive (TMR) element 24 composed of the laminate including the base layer 12, the antiferromagnetic layer 14, the pinned magnetic layer 16, the barrier layer 18, the free magnetization layer 20, and the cap layer 22 is provided on the lower shield layer 10.

A pair of hard films 28 is provided along the read-core width direction (the horizontal direction in FIG. 1A) on the lower shield layer 10 having the TMR element 24 thereon. The hard films 28 are made of, for example, cobalt-chromium-platinum (CoCrPt) and disposed so as to sandwich the TMR element 24. More specifically, the hard films 28 are provided on the top surface of the lower shield layer 10 and the side faces of the TMR element 24 with an insulating film 26 made of, for example, alumina therebetween. The insulating film 26 made of, for example, alumina is disposed on a sidewall portion in the element height direction (the horizontal direction in FIG. 1B) of the TMR element 24.

An upper shield layer 30 made of a soft magnetic material is provided on the TMR element 24. An example of the soft magnetic material is nickel-iron (NiFe).

FIG. 2 is a perspective view showing the structure of the read element. In FIG. 2, a plane parallel to the y-z plane corresponds to the cross-sectional view of FIG. 1A, and a cross section of the TMR element 24 portion parallel to the x-z plane corresponds to the cross section of FIG. 1B.

As shown in FIG. 2, the element height of the read element is specified by the width of the x-direction of the TMR element 24, the read-core width is specified by the width of the TMR element 24 (free magnetization layer 20) along the y-direction, and the read gap is specified by the thickness of the TMR element 24 (the distance between the lower shield layer 10 and the upper shield layer 30). In a known method of evaluating an element, the shape of a read element is evaluated by two-dimensionally observing a transmission image of an electron beam. However, in such a known method, the read-core width, the read gap, and the element height, all of which are orthogonal to each other cannot be measured using a single TEM sample.

Figure 3:
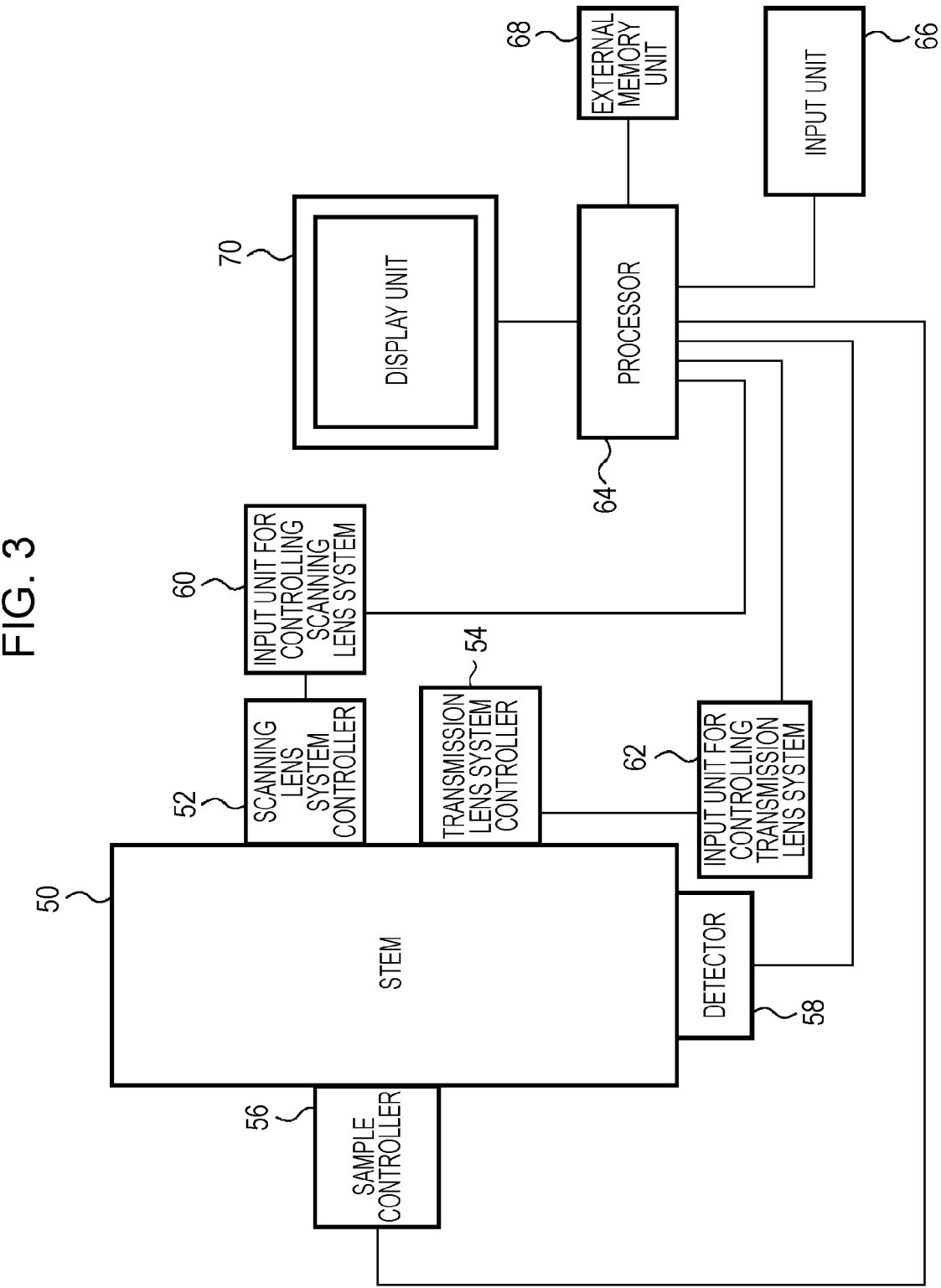
FIG. 3 is a schematic diagram showing the structure of an apparatus for evaluating an element according to an embodiment.
Figure 4:
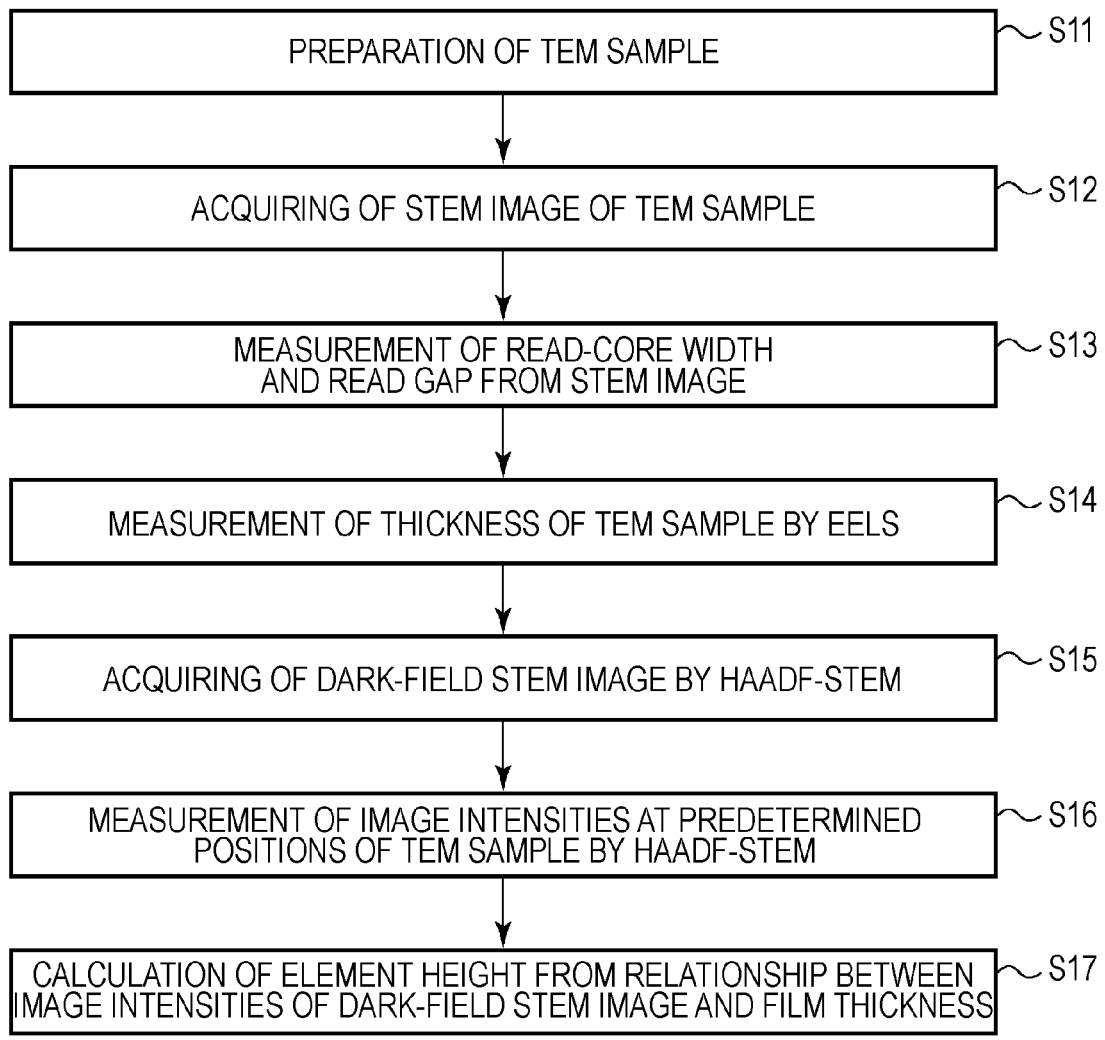
FIG. 4 is a flowchart showing a method of evaluating an element according to the embodiment.

Next, an apparatus for evaluating an element of this embodiment will be described with reference to FIG. 3.

The apparatus for evaluating an element of this embodiment includes a scanning transmission electron microscope (STEM) 50. The STEM 50 includes a scanning lens system controller 52 for controlling a scanning lens system, a transmission lens system controller 54 for controlling a transmission lens system, a sample controller 56 for controlling the position of an evaluation sample with respect to an electron beam, and a detector 58 for detecting the electron beam that has transmitted through the sample. Here, a scanning lens is a lens for controlling the electron beam to be incident on the evaluation sample. A transmission lens is a lens for controlling the electron beam that has transmitted through the evaluation sample.

The sample controller 56 is connected to a processor 64. The scanning lens system controller 52 is connected to the processor 64 via an input unit 60 for controlling the scanning lens system. The transmission lens system controller 54 is connected to the processor 64 via an input unit 62 for controlling the transmission lens system. According to this structure, an electron beam is converged and incident on any desired position of the evaluation sample, and the electron beam that has transmitted through the evaluation sample is led to the detector 58. The detector 58 includes a STEM detector that acquires a STEM image obtained from the evaluation sample, and an annular detector that detects the electron beam scattered by the evaluation sample at a high angle.

The processor 64 functions as a controller that controls, for example, the scanning lens system controller 52, the transmission lens system controller 54, and the sample controller 56 and also functions as an analytical instrument that analyzes measured data input from the detector 58. An input unit 66 for inputting information required for the measurement and the like from the outside, an external memory unit 68 that stores, for example, a data base used for the analysis of the measured data, and a display unit 70 that displays, for example, the analysis results are also connected to the processor 64.

Next, a method of evaluating an element according to this embodiment will be described with reference to FIGS. 4 to 11.

First, a sample to be observed with the STEM 50 (hereinafter referred to as "TEM sample") is prepared from a read element for evaluation (Step S11). The TEM sample is formed by removing the read element by polishing and trimming from a surface side, the surface facing the ABS, to prepare a thin section. More specifically, the thickness of the read element is reduced to the extent that observation with a TEM can be performed (to about 150 nm) so that the resulting TEM sample includes an area including a whole TMR element 24 when viewed from the ABS side.

Figure 5B:
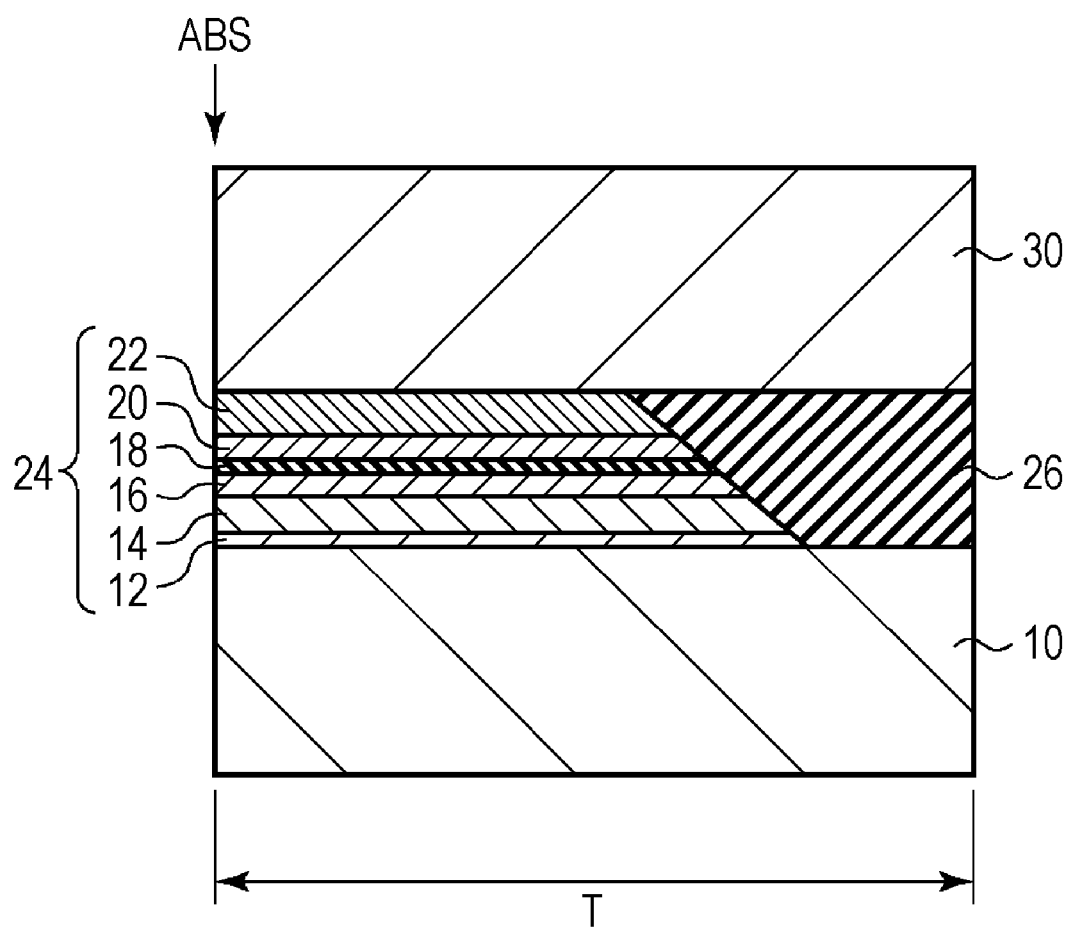

FIGS. 5A and 5B are schematic views showing an example of a TEM sample prepared in Step S11. FIG. 5A is a view of the TEM sample viewed from the ABS side. FIG. 5B is a cross-sectional view of the TMR 24 portion in the element height direction (i.e., a cross-sectional view taken along line VB-VB in FIG. 5A). As shown in FIG. 5B, the TEM sample is prepared so that the insulating film 26 remains at a surface side, the surface facing the ABS. That is, the thickness of the read element is reduced so that a thickness T in FIG. 5B is larger than the element height.

Subsequently, the TEM sample prepared in Step S11 is placed on a sample stage (not shown) of the STEM 50, and the pressure in a lens barrel is then reduced to a predetermined pressure.

Subsequently, an electron beam is incident on the TEM sample placed on the sample stage. More specifically, while converging and scanning an electron beam generated by an electron gun (not shown) using the scanning lens system controller 52, the electron beam is incident on the TEM sample. The electron beam that has transmitted through the TEM sample is then detected with the detector 58 to acquire an STEM image (Step S12).

Subsequently, the acquired STEM image is output from the detector 58 to the processor 64, and the read-core width and the read gap are measured with the processor 64 (Step S13). The STEM image obtained from the TEM sample corresponds to a whole image of the element viewed from the ABS side. Accordingly, the read-core width and the read gap can be measured from the acquired STEM image.

Figure 6:
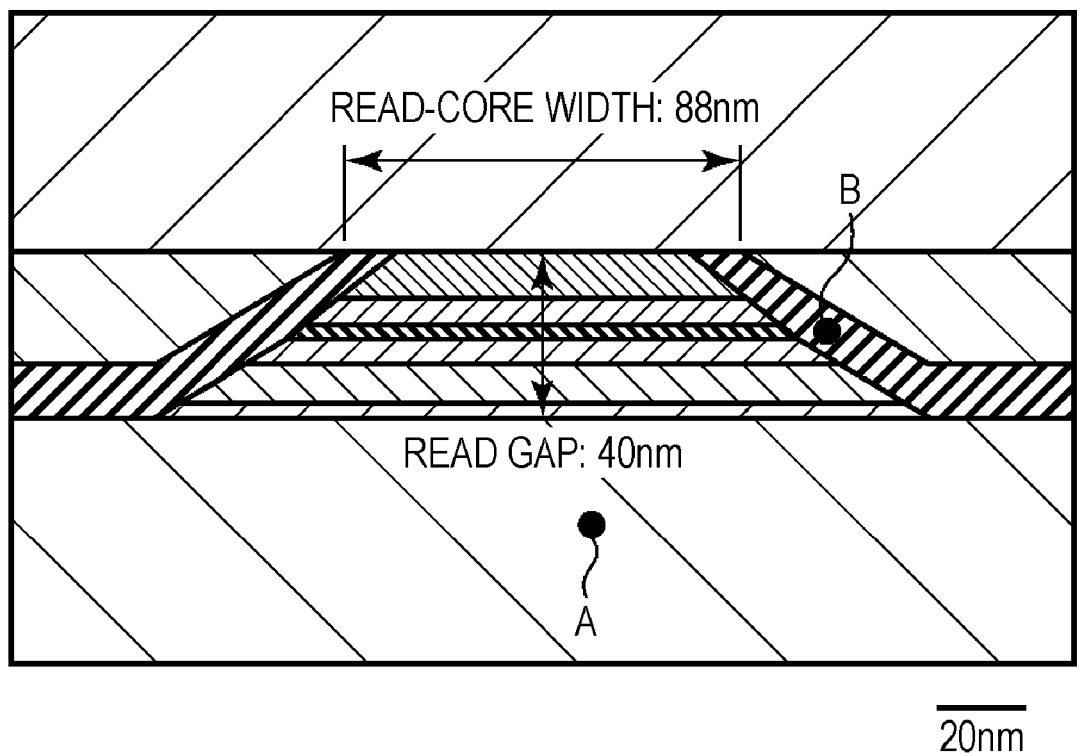
FIG. 6 is a schematic view of a scanning transmission electron microscopy (STEM) image measured by the method of evaluating an element according to the embodiment.

FIG. 6 is a schematic view of the STEM image acquired in this step. As shown in FIG. 6, the read element measured by the inventors of the present application has a read-core width of 88 nm and a read gap of 40 nm.

Subsequently, the electron beam is fixed at a predetermined position of the TEM sample, and the thickness of the TEM sample is measured by electron energy loss spectroscopy (EELS) (Step S14). The incident position of the electron beam can be confirmed with the STEM image.

Figure 7:
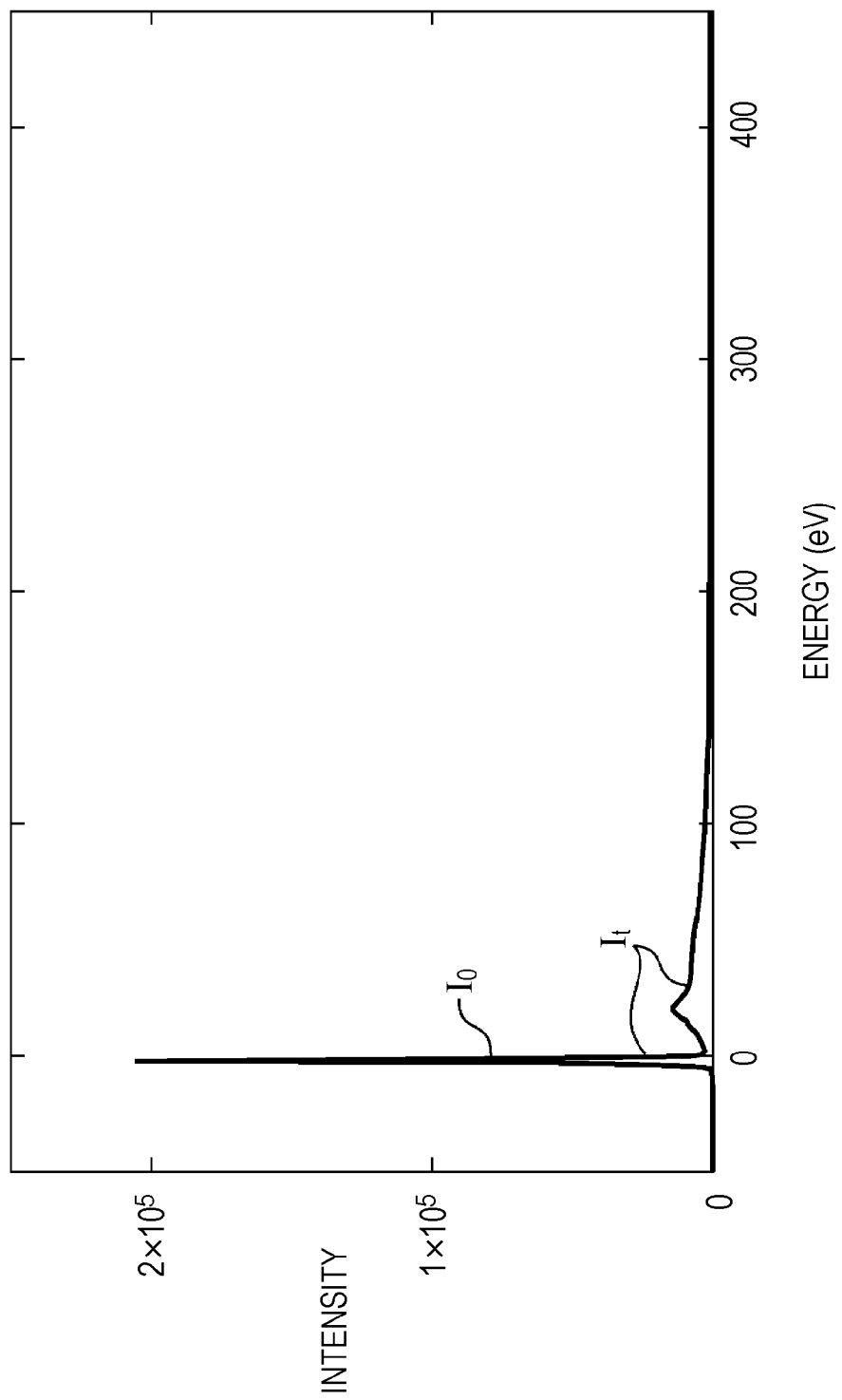
FIG. 7 is a graph showing an EELS spectrum measured in an area where a lower shield layer is formed.

FIG. 7 is a graph showing an example of an EELS spectrum. The vertical axis represents the electron-beam intensity and the horizontal axis represents the energy loss of the electron beam. That is, the EELS spectrum shows the distribution of the energy lost by high-energy electrons after transmitting through the sample.

The thickness T of the sample is represented by $$T = \lambda \ln(I_t/I_0)$$

wherein $I_0$ represents the intensity of an electron beam with no energy loss, that is, the electron-beam intensity at which the energy loss is zero (zero-loss intensity), $I_t$ represents the total intensity of the electron beam that has been transmitted through the sample, and $\lambda$ represents the inelastic scattering mean-free-path of an electron (see, for example, R. F. Egerton, "Electron Energy-Loss Spectroscopy in the Electron Microscope, Second Edition", Plenum Press, New York, 1996, p. 301). Accordingly, when the inelastic scattering mean-free-path $\lambda$ is determined, the thickness T of the sample can be calculated from an EELS spectrum.

The inelastic scattering mean-free-path $\lambda$ depends on the material constituting the sample. Accordingly, in calculating the thickness T of the sample from the EELS spectrum, a measurement is performed using a portion made of a single material over the entire area in the thickness direction of the sample. For example, a portion of the lower shield layer 10 (see point A in FIG. 6), a portion of the upper shield layer 30, or a portion of the insulating film 26 (see point B in FIG. 6) can be used for the measurement position.

In the TEM sample measured by the inventors of the present application, at point A of a portion of the lower shield layer 10 made of NiFe (a second portion), the inelastic scattering mean-free-path $\lambda$ is 92.7 nm, the zero-loss intensity $I_0$ is 131,730 counts, and the total intensity of the electron beam $I_t$ is 671,858 counts, and the thickness T of the TEM sample is measured to be 151.04 nm. In addition, at point B of a portion of the insulating film 26 made of alumina (a third portion), the inelastic scattering mean-free-path $\lambda$ is 124.0 nm, the zero-loss intensity $I_0$ is 602,531 counts, and the total intensity of the electron beam $I_t$ is 2,043,375 counts, and the thickness T of the TEM sample is measured to be 151.43 nm. Note that FIG. 7 is an EELS spectrum measured at point A.

Subsequently, a dark-field STEM image of the TEM sample is acquired by high-angle annular dark-field scanning transmission electron microscopy (HAADF-STEM) (Step S15).

Figure 8:
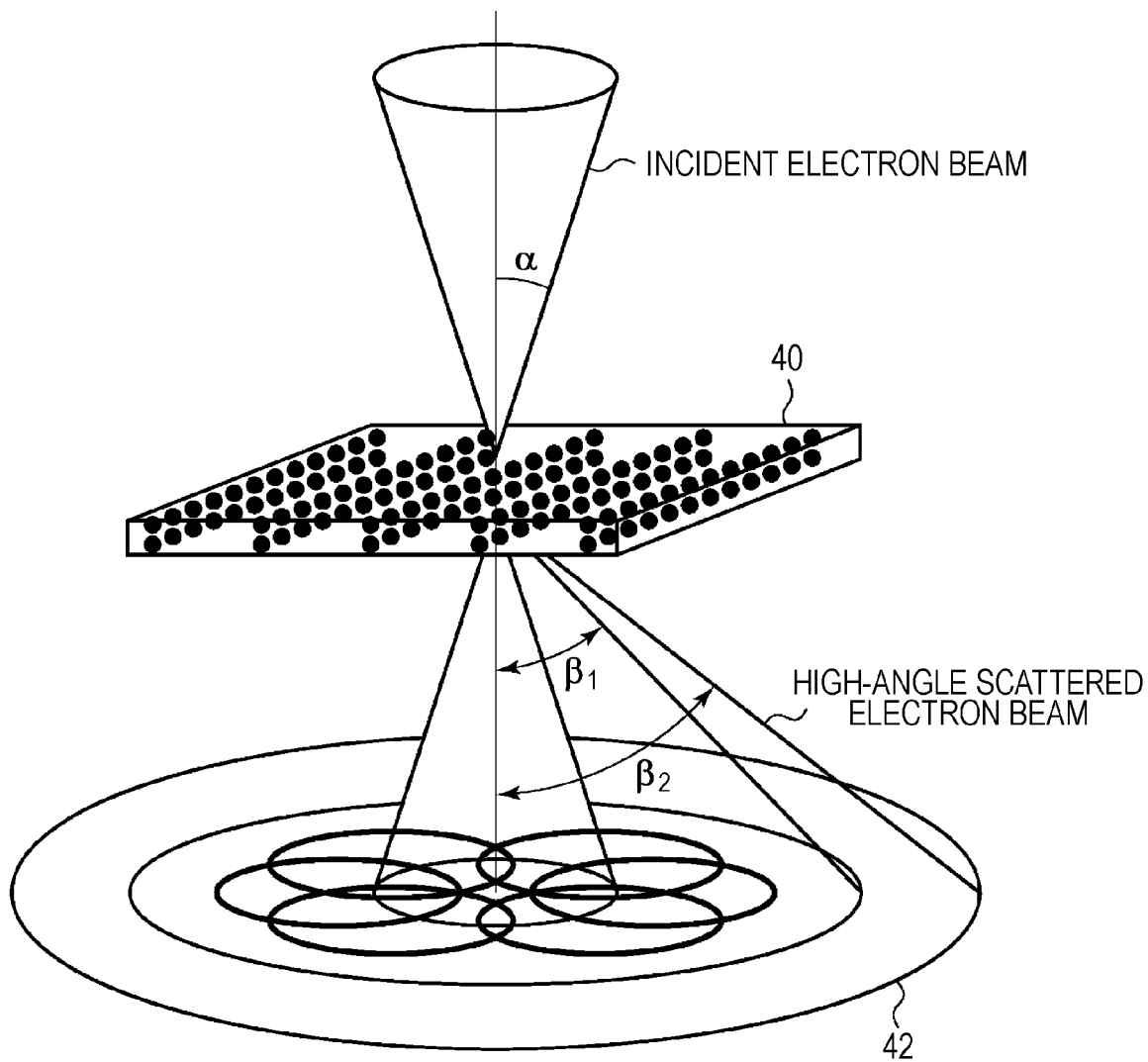
FIG. 8 is a schematic view illustrating the principle of annular dark-field scanning transmission electron microscopy (STEM)

In HAADF-STEM, as shown in FIG. 8, high-angle scattered electrons that are scattered by a TEM sample 40 (i.e., electrons that are scattered at an scattering angle in the range of $\beta 1$ to $\beta 2$ in FIG. 8) are detected by an annular detector 42 to acquire a STEM image.

Figure 9:
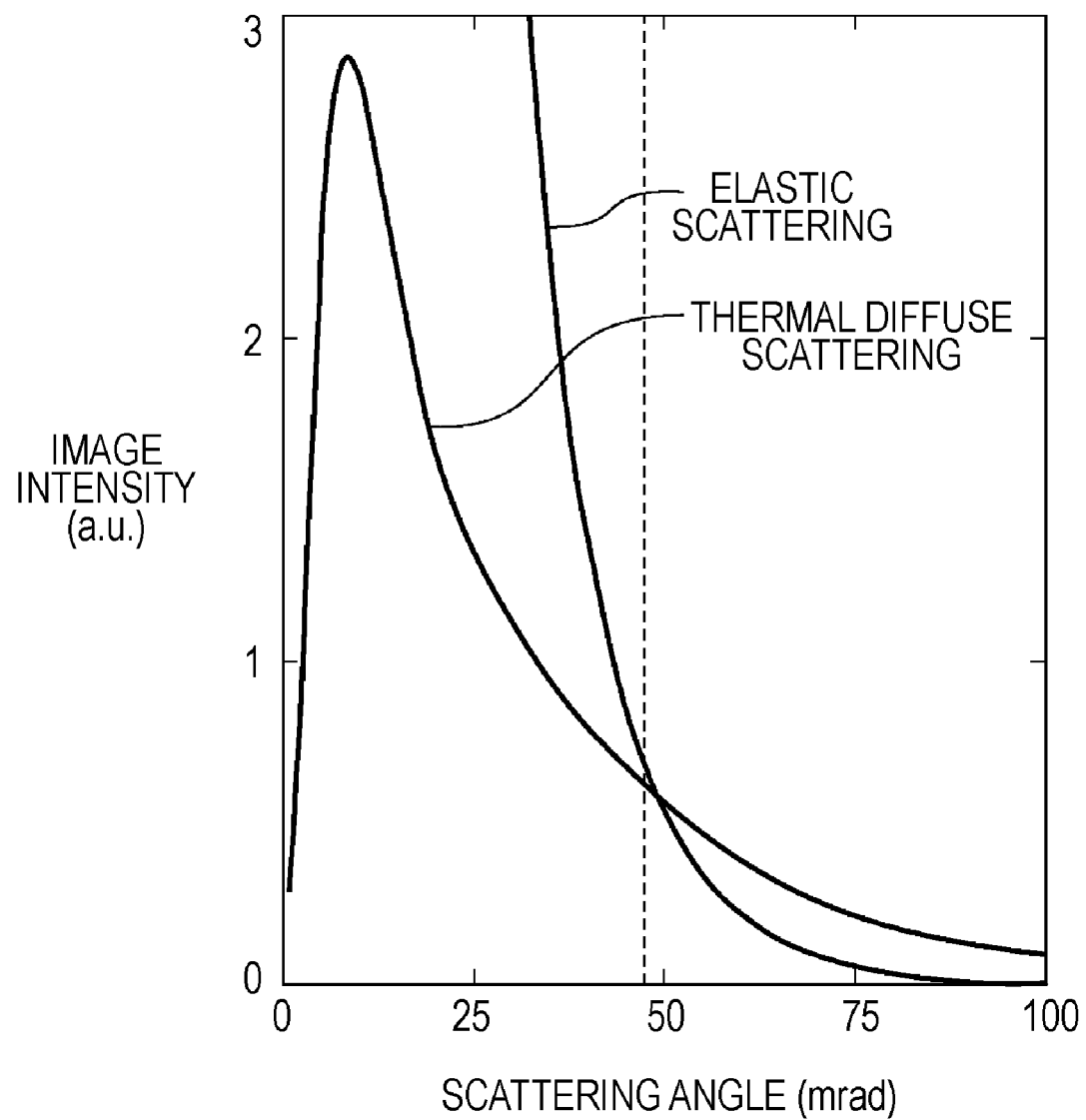
FIG. 9 is a graph showing the relationship between the image intensity and the scattering angle in the annular dark-field STEM.

As shown in FIG. 9, in the case of low-angle scattering; elastically scattered electrons are mainly responsible for the high image intensity. In contrast, in the case of high-angle scattering (about 40 mrad or more), thermal diffusely scattered electrons are mainly responsible for the high image intensity. That is, in electrons scattered at a high angle, thermal diffuse scattering becomes dominant, and the image intensity shows a contrast dependent on the atomic mass (see, for example, A. V. Crew, J. Wall, J. Langmore, Science, 168, 1338 (1970)).

In Step S13, the read-core width and the read gap are measured from the STEM image acquired in Step S12. Alternatively, the read-core width and the read gap may be measured from the dark-field STEM image acquired in this step.

Subsequently, an image intensity (electron-beam intensity) at a predetermined position of the TEM sample is measured by HAADF-STEM (Step S16). The incident position of the electron beam can be confirmed with the dark-field STEM image.

Figure 10:
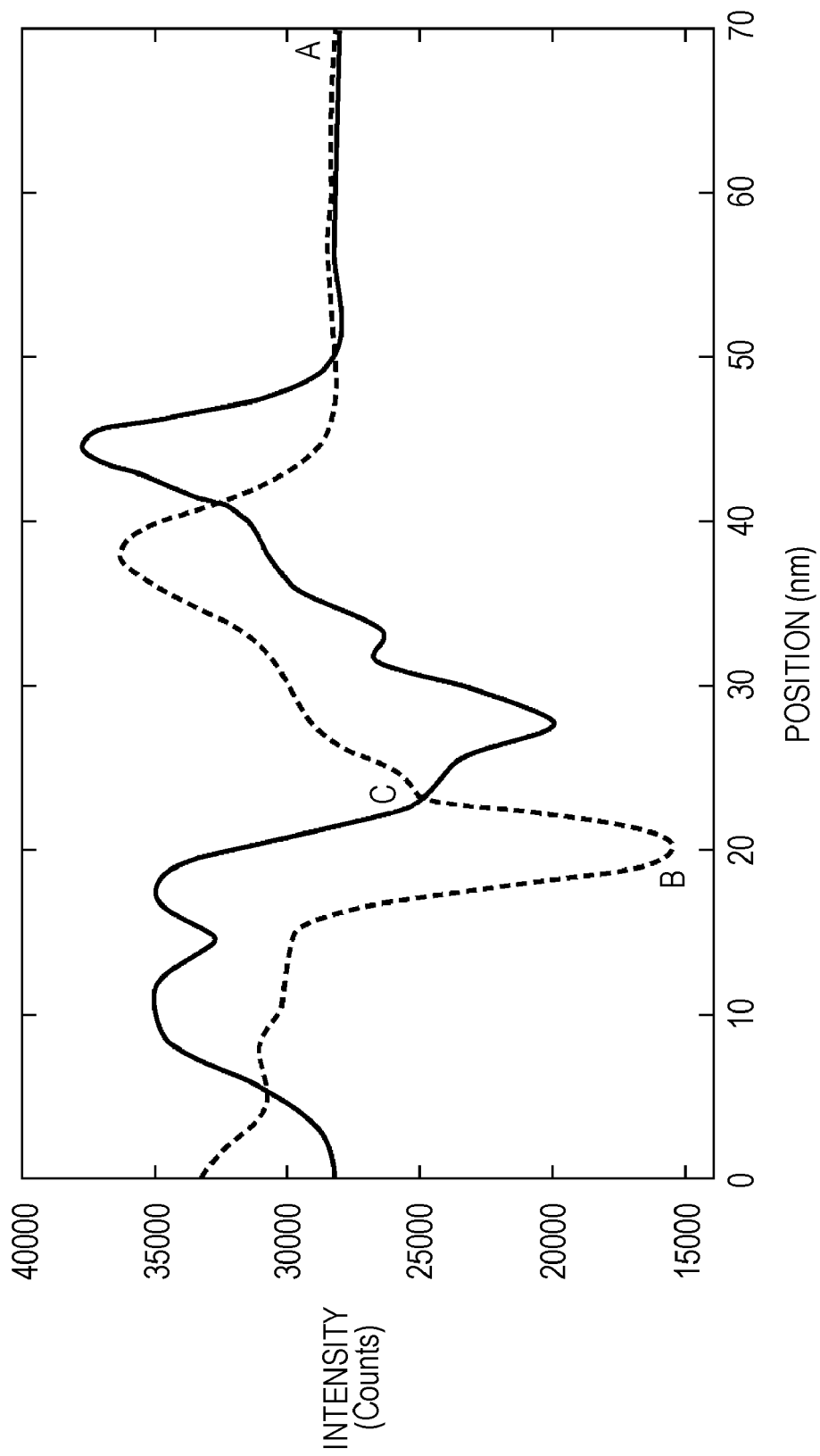
FIG. 10 is a graph showing the relationship between the image intensity and sample positions measured by annular dark-field STEM.
Figure 11:
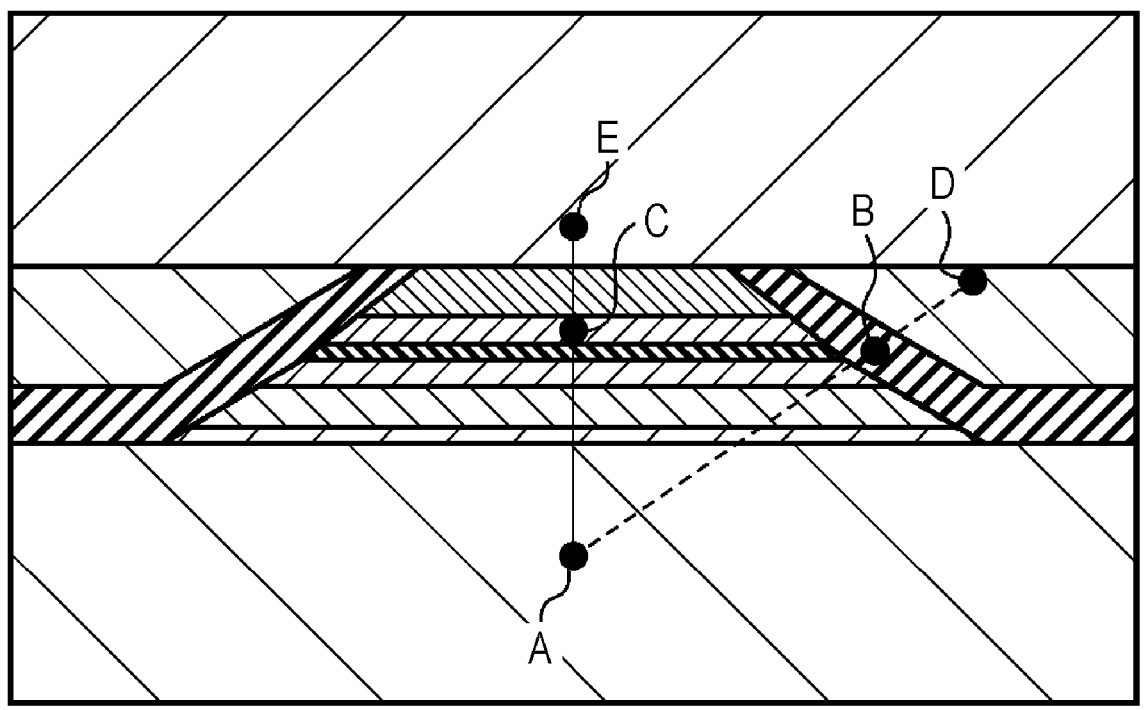
FIG. 11 is a view showing scanning routes in the measurement shown in FIG. 10.

FIG. 10 is a graph showing measurement results of the image intensity along a path from point A to point D through point B in the cross-sectional view of FIG. 11 (the dotted line in FIG. 10) and the image intensity along a path from point A to point E through point C in the cross-sectional view of FIG. 11 (the solid line in FIG. 10). In FIG. 10, point A corresponds to a portion of the lower shield layer 10 made of NiFe, point B corresponds to a portion of the insulating film 26 made of alumina, and point C corresponds to a portion of the free magnetization layer 20 made of NiFe/CoFe. In the measurement results shown in FIG. 10, the image intensity at point A is determined to be about 28,000, the image intensity at point B is determined to be 15,000, and the image intensity at point C is determined to be 24,000 (all of these image intensities are given in units of the number of counts).

Subsequently, the element height of the read element is calculated from the calculated image intensities at the positions, and the thickness of the TEM sample calculated in Step S14 using the processor 64 (Step S17).

An image intensity measured by HAADF-STEM can be described as a product of a coefficient dependent on the atomic mass of a constituent element and the film thickness.

More specifically, regarding point A, the image intensity IA at point A can be represented by $$IA = \alpha \times TA \quad (1)$$

wherein $\alpha$ represents a coefficient dependent on the atomic masses of the constituent elements of NiFe, and TA represents the thickness.

Similarly, regarding point B, the image intensity IB at point B can be represented by $$IB = \beta \times TB \quad (2)$$

wherein β represents a coefficient dependent on the atomic masses of the constituent elements of alumina and TB represents the thickness.

On the other hand, when viewed in the thickness direction of the TEM sample, point C has a two-layer structure (a first portion) in which the free magnetization layer 20 (a first layer) made of NiFe/CoFe and the insulating film 26 (a second layer) are laminated (see FIG. 1B). The insulating film 26 of FIG. 1A has a one-layer structure (a third portion). Accordingly, the image intensity IC at point C can be represented by $$IC = \gamma \times tA + \beta \times tB \quad (3)$$

wherein γ represents a coefficient dependent on the atomic masses of the constituent elements of NiFe/CoFe, tA represents the thickness of the free magnetization layer 20 (i.e., element height), β represents a coefficient dependent on the atomic masses of the constituent elements of alumina, and tB represents the thickness of the insulating film 26.

Here, NiFe/CoFe constituting the free magnetization layer 20 is composed of the same material as NiFe, which constitutes the lower shield layer 10, and a similar material having atomic masses close to those of the constituent elements of NiFe. Accordingly, γ can be approximated to α, i.e., γ≈α, and equation (3) can be rewritten as follows:

$$IC = \alpha \times tA + \beta \times tB \quad (3)'$$

In addition, the thickness T of the TEM sample, the thickness of the free magnetization layer 20, and the thickness of the insulating film 26 satisfy the following relationship:

$$T = TA = TB = tA + tB \quad (4)$$

Accordingly, by substituting α determined from equation (1), β determined from equation (2), and tB determined from equation (4) into equation (3)', the following relationship is obtained:

$$IC = (IA/T) \times tA + (IB/T) \times (T-tA)$$

By solving this equation for tA, the following relationship is obtained:

$$tA = T(IC-IB)/(IA-IB) \quad (5)$$

Accordingly, by substituting the measured value of the thickness T (151 nm), the image intensity at point A (IA=28,000), the image intensity at point B (IB=15,000), and the image intensity at point C (IC=24,000) into equation (5), the film thickness tA can be calculated as tA=104.5 nm. In addition, from equation (4), the film thickness tB can be calculated as tB=46.5 nm.

Thus, the element height (film thickness tA) of the read element can be calculated as 104.5 nm.

As described above, according to this embodiment, a thin TEM sample is prepared by reducing the thickness of a read element of a magnetic head in the element height direction; the image intensity in an area where a TMR element is formed, the image intensity in an area where a shield layer is formed, and the image intensity in an area where an insulating film is formed are measured by annular dark-field STEM; and the film thickness of the TEM sample is measured from an EELS spectrum of the area where the shield layer is formed or the area where the insulating film is formed. Accordingly, the element height of the TMR element can be calculated from the relationship between these image intensities and the film thicknesses.

In addition, the read-core width and the read gap of the read element can be measured from a STEM image of the same TEM sample. Accordingly, the read-core width, the read gap, and the element height of the read element can be measured using the same thin TEM sample prepared by reducing the thickness of the read element in the element height direction.

Consequently, a TEM sample can be easily prepared, and thus the number of steps required for the evaluation can be markedly reduced. Furthermore, it is possible to rapidly feedback the evaluation results to the production process of read elements, thus improving the production yield of the read elements.

MODIFICATIONS

The present invention is not limited to the above embodiment, and various modifications can be made.

For example, in the above embodiment, the lower shield layer 10 and the insulating film 26 are used as the areas each of which is made of a single material over the entire area in the thickness direction of the TEM sample. Alternatively, other areas may be used. For example, the upper shield layer 30 may be used instead of the lower shield layer 10.

In addition, in the above embodiment, the image intensity in the free magnetization layer 20 is used for the calculation of the element height of the TMR element 24. Alternatively, an image intensity in another area may be used. For example, when a portion made of a material similar to that of the base layer 12 or the cap layer 22 is provided over the entire area in the thickness direction of the TEM sample, the measurement may be performed using any of these layers.

In the above embodiment, the method of evaluating an element of the present invention is applied to the measurement of the element height of a read element of a magnetic head, but the element to which the present invention is applied is not limited thereto.

The method of evaluating an element of the present invention can be widely applied to the measurement of an evaluation sample including a first portion in which a first layer containing a first material and a second layer containing a second material are laminated, a second portion containing the first material, and a third portion containing the second material.

What is claimed is:

1. A method of evaluating an element comprising:
   preparing a thin evaluation sample including a first portion in which a first layer containing a first material and a second layer containing a second material are laminated, a second portion containing the first material, and a third portion containing the second material;
   irradiating the first portion with an electron beam to measure a first electron-beam intensity which is an intensity of electrons showing a contrast dependent on an atomic mass of a material through which the electron beam has been transmitted among electrons that have been transmitted through the evaluation sample;
   irradiating the second portion with an electron beam to measure a second electron-beam intensity which is an intensity of electrons showing a contrast dependent on an atomic mass of the first material through which the electron beam has been transmitted among electrons that have been transmitted through the evaluation sample;
   irradiating the third portion with an electron beam to measure a third electron-beam intensity which is an intensity of electrons showing a contrast dependent on the atomic mass of the second material through which the electron beam has been transmitted among electrons that have been transmitted through the evaluation sample; and calculating a thickness of the first layer in the first portion by calculating a relationship between the first electron-beam intensity and the thickness of the first layer from a relationship between the second electron-beam intensity and a thickness of the evaluation sample and a relationship between the third electron-beam intensity and the thickness of the evaluation sample.

2. The method according to claim 1,
wherein the first electron-beam intensity is an intensity of electrons showing a contrast dependent on the atomic mass of a constituent element of the first material and the atomic mass of a constituent element of the second material among electrons that have been transmitted through the evaluation sample, the second electron-beam intensity is an intensity of electrons showing a contrast dependent on the atomic mass of the constituent element of the first material among electrons that have been transmitted through the evaluation sample, and the third electron-beam intensity is an intensity of electrons showing a contrast dependent on the atomic mass of the constituent element of the second material among electrons that have been transmitted through the evaluation sample.

3. The method according to claim 1,
wherein the first electron-beam intensity, the second electron-beam intensity, and the third electron-beam intensity are measured by annular dark-field scanning transmission electron microscopy.

4. The method according to claim 3,
wherein when the first electron-beam intensity, the second electron-beam intensity, and the third electron-beam intensity are measured, transmitted electrons which are scattered by the evaluation sample at an angle of 40 mrad or more are detected.

5. The method according to claim 1,
wherein when the thickness of the evaluation sample is represented by T, the first electron-beam intensity is represented by IC, the second electron-beam intensity is represented by IA, and the third electron-beam intensity is represented by IB, a thickness tA of the first portion is calculated using the following relational expression:

$tA = T(IC-IB)/(IA-IB)$.

6. The method according to claim 1,
wherein the thickness of the evaluation sample is calculated from an electron energy loss spectrum in the second portion or the third portion.

7. The method according to claim 1,
wherein the second portion is made of a material composed of a constituent element having an atomic mass close to that of a constituent element of the first material, and the third portion is made of a material composed of a constituent element having an atomic mass close to that of a constituent element of the second material.

8. The method according to claim 1,
wherein the evaluation sample is a thin section of a read element of a magnetic head including a first shield layer, a magnetoresistive element provided on the first shield layer, an insulating film provided on a part of the first shield layer other than where the magnetoresistive element is formed, and a second shield layer provided on the magnetoresistive element, the first layer of the first portion is an area where the magnetoresistive element is formed, the second portion is an area where the first shield layer or the second shield layer is formed, the third portion and the second layer of the first portion are areas where the insulating film is formed, and the thickness of the first layer is the element height of the magnetoresistive element.

9. The method according to claim 8,
wherein an electron-beam transmission image of the evaluation sample is acquired, and at least one of a read-core width and a read gap of the read element is measured from the electron-beam transmission image.

10. An element evaluation apparatus for evaluating a thin evaluation sample including a first portion in which a first layer containing a first material and a second layer containing a second material are laminated, a second portion containing the first material, and a third portion containing the second material, the apparatus comprising:

an electron microscope including an electron gun that applies a convergent electron beam to the evaluation sample and an annular detector that detects scattered electrons showing a contrast dependent on an atomic mass of a constituent element of the evaluation sample among electrons that have been transmitted through the evaluation sample;

a measurement mechanism that measures, after the incidence of the electron beam on the evaluation sample, a first electron-beam intensity, a second electron-beam intensity, and a third electron-beam intensity, the first electron-beam intensity being an intensity of electrons showing a contrast dependent on an atomic mass of a material through which the electron beam has been transmitted among electrons that have been transmitted through the first portion, the second electron-beam intensity being an intensity of electrons showing a contrast dependent on an atomic mass of a material through which the electron beam has been transmitted among electrons that have been transmitted through the second portion, and the third electron-beam intensity being an intensity of electrons showing a contrast dependent on an atomic mass of a material through which the electron beam has been transmitted among electrons that have been transmitted through the third portion; and a calculation mechanism that calculates a thickness of the first layer in the first portion by calculating a relationship between the first electron-beam intensity and the thickness of the first layer from a relationship between the second electron-beam intensity measured by the measurement mechanism and a thickness of the evaluation sample and a relationship between the third electron-beam intensity and the thickness of the evaluation sample.

* * * * *